Sept. 16, 1958  I. L. JOY  2,851,877
VIBRATION TESTING DEVICE
Filed Oct. 7, 1955
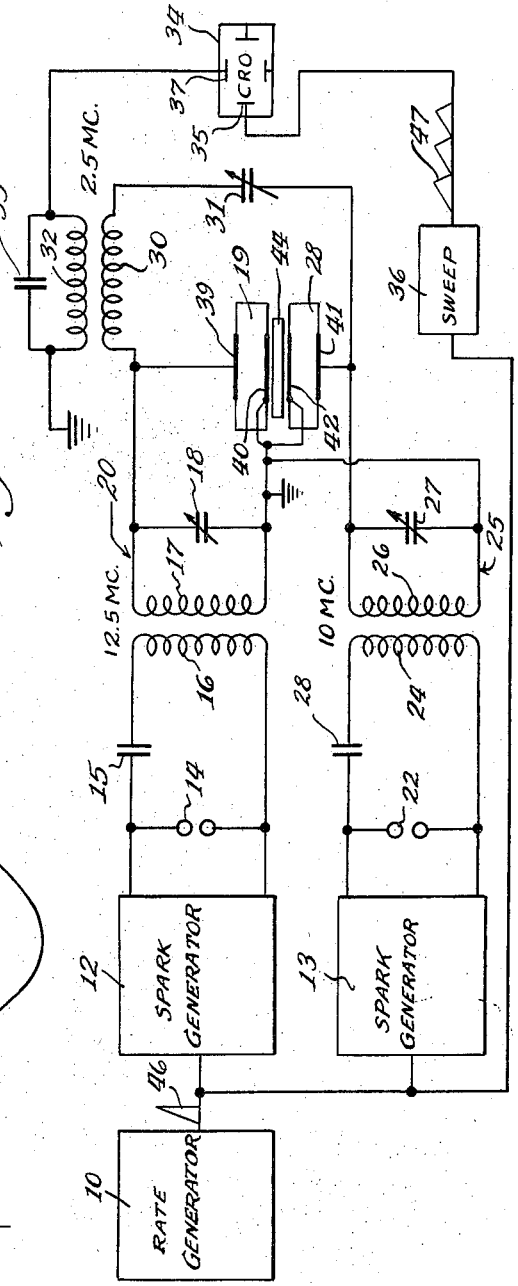
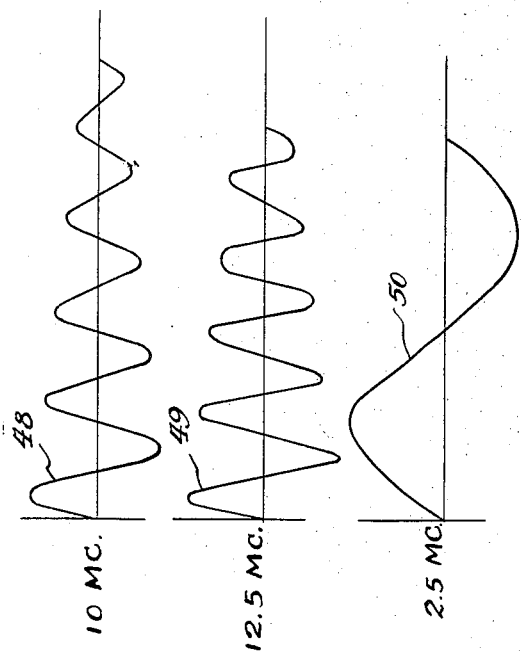
Inventor
Ivan L. Joy
By Mann, Brown and Hansmann
Attys.

United States Patent Office 2,851,877
Patented Sept. 16, 1958

2,851,877

VIBRATION TESTING DEVICE

Ivan L. Joy, Topeka, Kans.

Application October 7, 1955, Serial No. 539,128

7 Claims. (Cl. 73—67.8)

This invention relates to a vibration testing device and more particularly is concerned with a transducer arrangement for generating vibrational waves of extremely short duration.

Ultrasonics find important application in the testing of object for internal defects such as inclusions, voids, cracks, and other non-homogeneities. One important ultrasonic testing system is based upon the well known pulse-echo method such as is shown and described in Langevin Patent No. 1,858,931. Briefly the Langevin system consists in transmitting ultrasonic energy in an object and measuring the elapsed time between the transmission of the energy and the reception of the energy reflected from various non-homogeneities within the object.

When such a system is applied to the testing of metals and the like, it will be seen that the duration of the pulse becomes a limiting factor in the proper inspection of the part under test. It should be apparent that if the time duration of the pulse exceeds twice the travel time of the pulse between successive reflecting regions, there will be an overlapping of the trailing portion of the wave energy reflected from the first such surface with the initial portion of the wave energy reflected from an adjacent surface. This overlapping of reflected waves tends to obscure one of these adjacent regions.

More specifically, in testing a bounded part, the energy reflected from the front and rear surfaces tends to obscure the presence of energy reflected from flaws immediately adjacent these surfaces. In addition, closely spaced flaws, regardless of their location relative to the surfaces of the part, will appear as but a single flaw. Thus the pulse length may be said to adversely affect the resolving power of a pulse-echo system.

It is, of course, quite easy to produce an electrical pulse of the desired short duration but when this is applied to a crystal transducer the resulting vibrational wave persists, though at progressively decreasing amplitude, for an objectionably long period of time. Various solutions to this problem have been proposed but have been found to be somewhat unreliable particularly in such exacting applications as the progressive testing of rail.

It is the principal object of the present invention to provide transducer means capable of emitting a vibrational wave of extremely short time duration.

Other objects and advantages of the invention will be apparent during the course of the following description.

In the accompanying drawings forming a part of this specification and in which like numerals are employed to designate like parts throughout the same, Fig. 1 is a diagram of an ultrasonic testing system including a transducer constructed and connected in accordance with the invention; and Fig. 2 is a graph of the vibrational waves produced by the system of Fig. 1.

It should be understood that the description of the preferred form of the invention is for the purpose of complying with Section 112, Title 35 of the U. S. Code and that the appended claims should be construed as broadly as the prior art will permit.

Referring now to the drawings, Fig. 1 illustrates an adaptation of the pulse-echo system of Langevin Patent No. 1,858,931 to a novel transducer constructed and arranged in accordance with the invention.

A rate generator is indicated at 10 and may be of any conventional type for generating periodic positive pulses. A pulse repetition rate of 2000 pulses per second is preferred for the testing of rail; however, this may be varied over wide limits. Other applications may require different pulse repetition rates.

A positive pulse 46 is periodically sent to the spark generators 12 and 13 each of which may be constructed after the manner of the spark generator of the said Langevin patent. Spark generator 12 applies energy periodically across the spark gap 14 the terminals of which are bridged by a series connected capacitor 15 and inductance 16.

The inductance 16 is coupled to an oscillating circuit 20 comprising an inductance 17, a variable capacitor 18 and a crystal transducer 19. These inductive and capacitive elements are selected so that the oscillatory circuit will generate momentary electrical vibrations corresponding in frequency to the resonant frequency of the transducer and for purposes of illustration the transducer 19 is assumed to have a resonant frequency of 12.5 megacycles.

It should be understood that the circuit is damped appropriately so that the oscillations persist for no more than a single cycle.

Similarly spark generator 13 applies energy periodically across the spark gap 22 the terminals of which are bridged by capacitor 23 and inductance 24. The inductance 24 is coupled to an oscillatory circuit 25 comprising an inductance 26, a variable capacitor 27, and a crystal transducer 28. The circuit elements associated with transducer 28 are selected so that the oscillatory circuit 25 will generate momentary electrical vibrations at the resonant frequency of the transducer. In the case of oscillatory circuit 25 a transducer having a resonant frequency of 10 megacycles is chosen. This circuit is also appropriately damped to limit its oscillation to no more than a single cycle.

From the foregoing it will be apparent that each transducer will be excited at its resonant frequency by electrical signals of extremely short duration and accordingly will generate vibrational signals at their resonant frequency. Due to the fact that transducers tend to ring, the vibrational signal persists for a number of cycles though the applied electrical signal terminates after one cycle or less.

The present invention takes advantage of the fact that the ringing time of a crystal transducer is inversely proportional to its resonant frequency and therefore employs high frequency crystals in order to minimize ringing time. However, for the testing of rail and similar objects, supersonic vibration waves of a frequency of 2 to 3 magacycles are preferred and for the purposes of the present explanation a frequency of 2.5 megacycles is selected.

Therefore the 10 and 12.5 megacycle crystals are connected mechanincally so that the 10 and 12.5 megacycle vibrational waves may be mixed to produce the usual modulation products. One of these products is a 2.5 megacycle vibrational wave and this may be directed into the part under test. If the sending transducer also serves as the receiving transducer it is provided with a detecting circuit comprising an inductance 30 and variable capacitance 31 that is coupled to a tuned circuit consisting of an inductance 32 and capacitance 33. The tuned circuit acts as a filter and is adapted to pass the 2.5 megacycle energy while excluding all other energy.

The remainder of the ultrasonic testing system comprises a cathode ray oscilloscope 34 having horizontal deflecting plates 35 that are supplied from a conventional sweep circuit 36 connected to the rate generator 10 for actuation in synchronism with the spark generators 12 and 13 and having vertical deflecting plates 37 for actuation by the 2.5 megacycle energy.

The crystal transducers 19 and 28 are stacked one on top of the other to form in effect a single composite transducer for generating a 2.5 megacycle vibrational wave of extremely short duration. Each of the crystals is an X-cut quartz crystal for producing longitudinal vibrational waves such as are required for the progressive testing of rail wherein a liquid sonic column is employed for coupling the vibrations from the transducer to the rail.

Accordingly the YZ faces of the crystals are coated with copper or some such similar material of high electrical conductivity. Crystal 19 is provided with coatings 39 and 40 and crystal 28 is provided with coatings 41 and 42 on the Y and Z faces respectively. These coatings serve as electrodes for the crystal and are connected to the oscillatory circuits 20 and 25 in the manner indicated.

It should be apparent that the stacked crystals are arranged with their X axes in alignment but acting in opposition and this is the preferred arrangement.

Cement designated 44 is used to bond the crystals 19 and 28 together and it should be capable of transmitting vibrational waves from one crystal to the other with a minimum of attenuation. One such suitablee cement is hard de Khotinski of Central Scientific Company. It will be noted that coatings 40 and 42 are connected electrically and if desired the cement 44 may be electrically conductive, though this is not necessary since the electrical connection may be effected externally.

Due to electrical considerations, the composite transducer cannot be directly immersed in water or any similar liquid of high electrical conductivity characteristics. Therefore in applications involving such coupling liquids, the transducer must be mounted in a special holder containing an insulating liquid and having a flexible diaphragm for transmitting the vibrational waves. Such holders are well known in the art and form no part of the invention.

The operation of the device is quite simple. The rate generator 10 periodically generates positive pulses 46 which on the one hand are transmitted to the spark generators 12 and 13 for momentarily exciting the crystals 19 and 28 at their resonant frequencies and which on the other hand initiate the sweep circuit 36 for applying a saw tooth wave 47 to the horizontal deflecting plates 35 of the cathode ray oscilloscope. The 10 megacycle transducer 28 generates a mechanical vibrational wave as indicated at 48 and the 12.5 megacycle transducer 19 generates a mechanical vibrational wave as indicated at 49. These waves are present simultaneously in the crystals and therefore mix to produce, among other modulation products, a 2.5 megacycle mechanical vibrational wave. This wave is designated 50 and is much shorter in time duration than waves produced by transducers having a resonant frequency of 2.5 megacycles.

The wave 50 thus produced is transmitted into the body under test and is reflected from discontinuities therein in the usual manner. The 2.5 megacycle energy is passed through a tuned circuit and is applied to the vertical plates 37 to produce the conventional "A" trace on the screen.

It should be apparent that the transducer arrangement of the invention finds advantageous application in any system wherein mechanical vibrational waves of extremely short duration are desired. In particular, it may be employed as a sending crystal for use in a system having a separate receiving crystal of the appropriate frequency. Obviously the ultrasonic system may be refined to incorporate selected features such as gating, prevention of blocking, elimination of the transmitted signal, etc. without departing from the spirit of the invention.

For purposes of explanation, X-cut crystals have been illustrated and described; however, Y-cut crystals might be arranged in similar fashion.

I claim:

1. A generator of vibrational waves comprising a pair of transducers of different resonant frequency mechanically coupled together to transmit mechanical vibrations therebetween, and means for momentarily actuating said transducers in synchronism to generate different vibrational waves in each transducer, the wave generated in each transducer being at the resonant frequency thereof whereby the waves are mixed to produce modulation products thereof.

2. A generator of short time vibrational waves of a predetermined frequency comprising a pair of transducers of different resonant frequencies both of which are high in comparison with said predetermined frequency and which differ in value by the amount of said predetermined frequency, said transducers being mechanically coupled together to transmit mechanical vibrations therebetween, and means for momentarily actuating said transducers in synchronism to generate different vibrational waves in each transducer, the wave generated in each transducer being at the resonant frequency thereof whereby the waves are mixed to produce modulation products thereof, one of which is of the value of said predetermined frequency.

3. A generator of vibrational waves comprising a pair of piezoelectric crystals of different resonant frequency mechanically coupled together to transmit mechanical vibrations therebetween, means for momentarily actuating said crystals in synchronism to generate different vibrational waves in each crystal, the wave generated in each crystal being at the resonant frequency thereof whereby the waves are mixed to produce modulation products.

4. A generator of short time vibrational waves of a predetermined frequency comprising a pair of piezoelectric crystals of different resonant frequencies both of which are high in comparison with said predetermined frequency and which differ in value by the amount of said predetermined frequency, said transducers being mechanically coupled together to transmit mechanical vibrations therebetween, and means for momentarily actuating said crystals in synchronism by applying a potential variation across each to generate different vibrational waves in each crystal, the wave generated in each crystal being at the resonant frequency thereof whereby the waves are mixed to produce modulation products thereof, one of which is of the value of said predetermined frequency.

5. A generator of vibrational waves comprising a pair of piezoelectric crystals of different resonant frequency arranged in stacked relationship with their corresponding axes in alignment and mechanically coupled together to transmit mechanical vibrations therebetween, and means for momentarily actuating said crystals in synchronism by applying a potential variation across each to generate different vibrational waves in each crystal, the wave generated at each crystal being at the resonant frequency thereof whereby said waves are mixed to produce modulation products.

6. A generator of vibrational waves comprising a pair of X-cut piezoelectric crystals of different resonant frequency arranged in stacked relationship with their X-axes in alignment and mechanically coupled together to transmit mechanical vibrations therebetween, and means for momentarily actuating said crystals in synchronism by applying a potential variation across each to generate different longitudinal vibrational waves in each crystal, the wave generated in each crystal being at the resonant frequency thereof whereby said waves are mixed to produce modulation products.

7. In an ultrasonic system for the inspection of a body by sending vibrational waves into said body and detecting vibrational energy reflected from discontinuities therein; the combination of sending means mechanically coupled to said body and generating short time vibrational waves of a predetermined frequency, said sending means comprising a pair of transducers of different resonant frequencies both of which are high in comparison with said predetermined frequency and which differ in value by the amount of said predetermined frequency, said transducers being mechanically coupled together to transmit mechanical vibrations therebetween, and means for momentarily actuating said transducers in synchronism to generate different vibrational waves in each transducer, the wave generated in each crystal being at the resonant frequency thereof whereby the waves are mixed to produce modulation products thereof, one of which is of the value of said predetermined frequency; and receiving means in energy-transferring relation with said body to receive energy signals derived from and corresponding in frequency to the energy of the vibrations transmitted by said sending means after reflection from discontinuities of said body, said receiving means being tuned to said predetermined frequency.

References Cited in the file of this patent

UNITED STATES PATENTS

| | | |
|---|---|---|
| 1,858,931 | Langevin et al. | May 17, 1932 |
| 2,625,035 | Firestone | Jan. 13, 1953 |
| 2,695,357 | Donley | Nov. 23, 1954 |